US011916805B2

(12) United States Patent
Kanak et al.

(10) Patent No.: US 11,916,805 B2
(45) Date of Patent: Feb. 27, 2024

(54) NETWORK DEVICE PROVISIONING BASED ON DEVICE TYPE

(71) Applicant: Cisco Technology, Inc., San Jose, CA (US)

(72) Inventors: Ather Sayeed Kanak, Fremont, CA (US); Abhishek Dhammawat, San Jose, CA (US); Kedar Krishnanand Gaonkar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/733,385

(22) Filed: Apr. 29, 2022

(65) Prior Publication Data
US 2023/0353502 A1    Nov. 2, 2023

(51) Int. Cl.
| | | |
|---|---|---|
| *H04L 47/72* | (2022.01) | |
| *H04L 47/80* | (2022.01) | |
| *H04L 47/76* | (2022.01) | |
| *H04L 9/40* | (2022.01) | |

(52) U.S. Cl.
CPC ............. *H04L 47/72* (2013.01); *H04L 47/76* (2013.01); *H04L 47/805* (2013.01); *H04L 63/0876* (2013.01)

(58) Field of Classification Search
CPC ....... H04L 47/72; H04L 47/76; H04L 47/805; H04L 63/0876
See application file for complete search history.

(56) References Cited

U.S. PATENT DOCUMENTS

| | | | |
|---|---|---|---|
| 9,277,559 B2 * | 3/2016 | Huang | ................ H04W 72/51 |
| 10,142,322 B2 | 11/2018 | Thodupunoori et al. | |
| 11,012,872 B1 | 5/2021 | Bellamkonda et al. | |
| 2013/0107783 A1 * | 5/2013 | Shaw | ..................... H04W 4/06 |
| | | | 370/312 |
| 2017/0142741 A1 * | 5/2017 | Kaur | .................. H04W 72/121 |
| 2017/0195136 A1 * | 7/2017 | Ghosh | ..................... H04L 47/72 |
| 2019/0312843 A1 * | 10/2019 | Grimm | ................ H04L 61/256 |
| 2020/0196300 A1 * | 6/2020 | Youtz | ..................... H04W 72/51 |
| 2020/0245283 A1 | 7/2020 | Cakulev et al. | |
| 2020/0304469 A1 | 9/2020 | Reimer | |
| 2020/0314622 A1 * | 10/2020 | Tofighbakhsh | ....... H04W 24/08 |

(Continued)

OTHER PUBLICATIONS

Akram Sheriff, et al., "Machine Learning Based Technique to Dynamically Allocate a Network Slice Based On User Equipment Type And Network Slice Selection Function Factor For 5g Wireless Internet of Things Networks," Technical Disclosure Commons, Dec. 12, 2018, 9 pages; https://www.tdcommons.org/dpubs_series/1774.

(Continued)

*Primary Examiner* — Chris Parry
*Assistant Examiner* — Steven C Nguyen
(74) *Attorney, Agent, or Firm* — Edell, Shapiro & Finnan, LLC

(57) ABSTRACT

Techniques are presented herein for provisioning network devices based on device type. In one example, a packet core gateway of a cellular core network identifies a device type of a network device and obtains an indication to provision the network device. In response to obtaining the indication to provision the network device, the packet core gateway provisions the network device with one or more network resources based on the device type of the network device.

20 Claims, 9 Drawing Sheets

(56) References Cited

U.S. PATENT DOCUMENTS

| | | | |
|---|---|---|---|
| 2021/0037390 A1* | 2/2021 | Tofighbakhsh | H04L 5/0044 |
| 2021/0168661 A1* | 6/2021 | Wong | H04L 63/123 |
| 2021/0337450 A1* | 10/2021 | Chen | H04W 36/0016 |
| 2021/0359956 A1* | 11/2021 | Abdulla | H04L 47/6295 |
| 2021/0368556 A1* | 11/2021 | Kedalagudde | H04W 48/16 |

OTHER PUBLICATIONS

"3rd Generation Partnership Project; Technical Specification Group Services and System Aspects; System architecture for the 5G System (5GS); Stage 2 (Release 17)," 3GPP TS 23.501 V17.4.0, Mar. 2022, 567 pages.

* cited by examiner

| INFORMATION ELEMENTS | P | CONDITION / COMMENT | APPL. | | | | IE TYPE |
|---|---|---|---|---|---|---|---|
| | | | Sxa | Sxb | Sxc | N4 | |
| NODE ID | M | THIS IE SHALL CONTAIN THE UNIQUE IDENTIFIER OF THE SENDING NODE | X | X | X | X | NODE ID |
| NODE REPORT TYPE | M | THIS IE SHALL INDICATE THE TYPE OF REPORT | X | X | X | X | NODE REPORT TYPE |
| USER PLANE RESOURCE REALLOCATION | C | THIS IE SHALL BE PRESENT IF THE NODE REPORT TYPE INDICATES A USER PLANE RESOURCE REALLOCATION REPORT | X | X | X | X | USER PLANE RESOURCE REALLOCATION REPORT |

NETWORK DEVICE PROVISIONING BASED ON DEVICE TYPE

TECHNICAL FIELD

The present disclosure relates to computer networking techniques.

BACKGROUND

A network (e.g., a cellular network) can be accessed by various types of network devices, including headed and headless network devices. When a network device attempts to gain access to an enterprise network for the first time, that network device often undergoes the process of network onboarding. During onboarding, the network and/or network device may be configured to enable the network device to send and receive network communications over the network.

BRIEF DESCRIPTION OF THE DRAWINGS

FIG. 7 illustrates an information element configured for re-allocating network resources based on device type, according to an example embodiment.

DESCRIPTION OF EXAMPLE EMBODIMENTS

Overview

Techniques are presented herein for provisioning network devices based on device type. In one example embodiment, a packet core gateway of a cellular core network identifies a device type of a network device and obtains an indication to provision the network device. In response to obtaining the indication to provision the network device, the packet core gateway provisions the network device with one or more network resources based on the device type of the network device.

Example Embodiments

Figure 1:
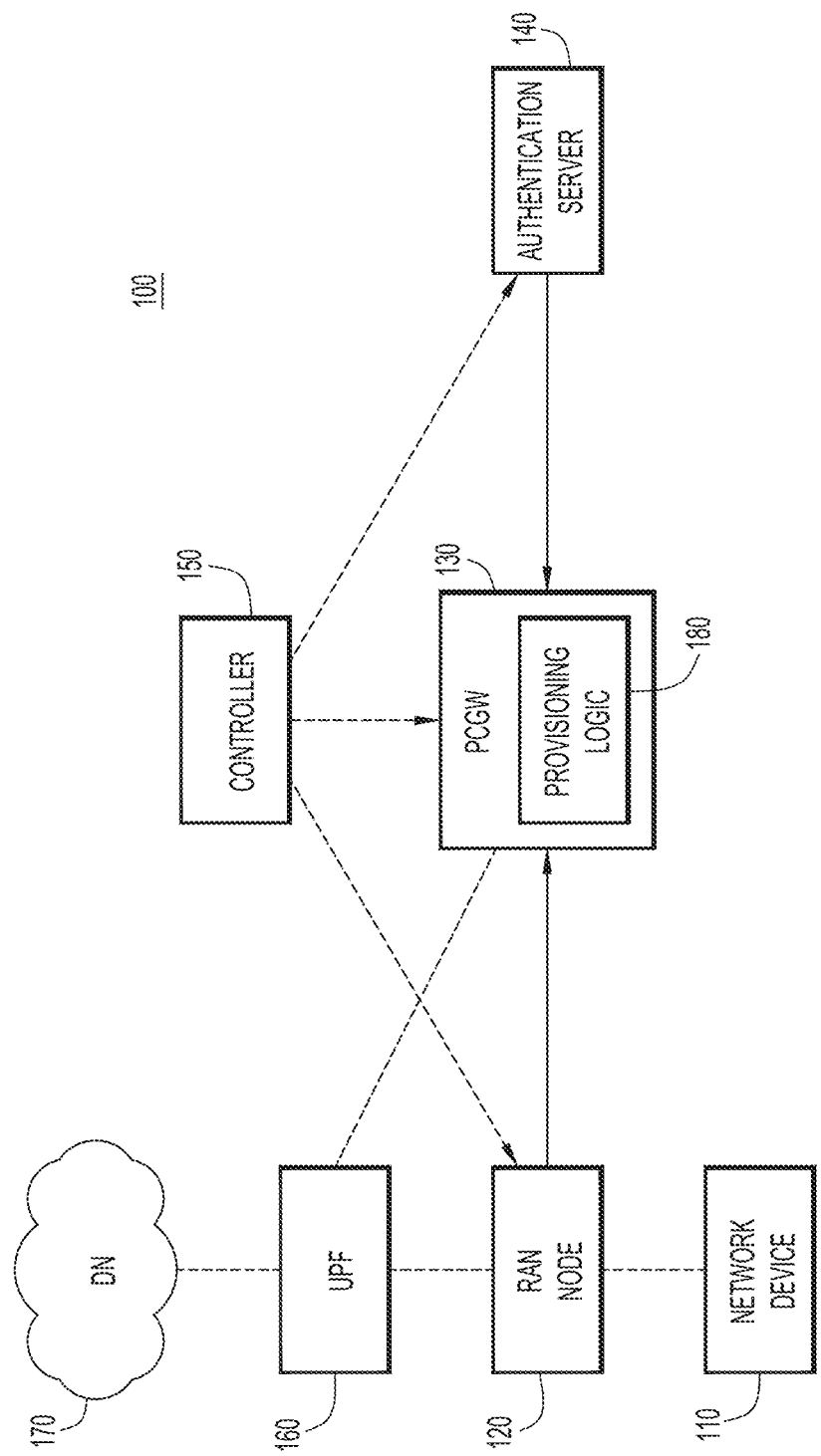
FIG. 1 illustrates a system configured for network device provisioning based on device type, according to an example embodiment.

FIG. 1 illustrates a system 100 configured for network device provisioning based on device type, according to an example embodiment. System 100 includes network device 110, Radio Access Network (RAN) node 120, Packet Core Gateway (PCGW) 130, authentication server 140, and controller 150. System 100 further includes User Plane Function (UPF) 160 and Data Network (DN) 170.

Network device 110 may be associated with any suitable device (e.g., a wireless device) configured to initiate a flow in system 100. For example, network device 110 may include one or more computers, vehicles and/or any other transportation-related devices having electronic devices configured thereon, automation devices, enterprise devices, appliances, Personal Digital Assistant (PDAs), laptops or electronic notebooks, cellular telephones, smartphones, tablets, Internet Protocol (IP) phones, mobile devices, and/or any other devices and/or combination of devices, components, elements, and/or objects capable of initiating voice, audio, video, media, or data exchanges within system 100. Network device 110 may also/alternatively be any device that seeks to initiate a communication on behalf of another entity or element such as a program, a database, or any other component, device, element, or object capable of initiating an exchange within system 100. In one example, network device 110 may be a User Equipment (UE).

Network device 110 may be an Internet of Things (IoT) device. The IoT is a general term used to describe the addition of networking capabilities to physical objects or "things" that serve some purpose or function outside of computing and/or networking technologies (i.e., traditionally "unconnected" or "offline" devices), such as thermometers, refrigerators, lights, wristbands, and sensors. In general, these "things," sometimes referred to as IoT enabled-devices, IoT devices, or special purpose network connected devices, are embedded with electronics, software, and network interfaces, which enable the physical objects to send and/or receive data packets over a network.

In one example, network device 110 may be a headless device, e.g., a device without a without a User Interface (UI). In another example, network device 110 may be a headed device, e.g., a device with a UI. Network device 110 may include any suitable interface to a human user such as a microphone, a display, a keyboard, or other terminal equipment. Network device 110 may be configured with appropriate hardware (e.g., processor(s), memory element (s), antennas and/or antenna arrays, baseband processors (modems), and/or the like), software, logic, and/or the like to facilitate respective over-the-air (air) interfaces for accessing/connecting to RAN 120.

RAN node 120 may include one or more cellular APs that terminate a cellular (e.g., 4G Long-Term Evolution (LTE) or 5G New Radio (NR)) air interface and may be configured with appropriate hardware (e.g., processor(s), memory element(s), antennas and/or antenna arrays, baseband processors (modems), and/or the like), software, logic, and/or the like to provide over-the-air coverage for a private cellular access network (e.g., private 4G LTE, private 5G NR, private Citizens Broadband Radio Service (CBRS), etc.). By 'private' it is meant that a private cellular access network provides network connectivity/services to clients (e.g., network device 110) served by a network operator and/or service provider of the private cellular access network, such as an enterprise. In one example, a private cellular access network may be considered to be a network that may be implemented to serve enterprise purposes (e.g., business purposes, government purposes, educational purposes, etc.) for enterprise clients (e.g., enterprise users/devices/etc.) in which the private cellular access network may be operated by any combination of traditional mobile network operators/ service providers, enterprises network operators/service providers, and/or third party network operators/service providers (e.g., neutral host network operators/service providers, cloud service providers, etc.). In various embodiments, RAN node 120 may be implemented as any combination of an evolved Node B (eNB) to facilitate 4G LTE air accesses, a next generation Node B (gNB) to facilitate 5G NR air accesses, a next generation (nG) radio to facilitate any next generation air accesses, a CBRS Device (CBSD) to facilitate CBRS accesses, and/or the like now known or hereafter developed.

In one example, RAN node 120 may include one or more Radio Units (RUs), Distributed Units (DUs) and Centralized Units (CUs). RUs are responsible for handling at least part of one or more lower layers of the protocol stack, and are located topologically close to network device 110. CUs are responsible for handling at least part of one or more upper layers of the protocol stack, and are located topologically far from network device 110. DUs are responsible for handling at least part of one or more remaining layers of the protocol stack, and are located between RUs and CUs.

PCGW 130 may be part of a cellular core network, and may include any suitable cellular (e.g., 5G) component such as an Access and Mobility Management Function (AMF) and/or a Session Management Function (SMF). An AMF may facilitate access and mobility management control/services for one or more network devices, such as network device 110, to facilitate one or more over-the-air Radio Frequency (RF) connection(s) between the network device 110 and RAN node 120. An SMF may be responsible for Protocol Data Unit (PDU) Session Management (SM), with individual functions/services being supported on a per-session basis in order to facilitate data transfer(s) between network device 110 and one or more data network(s).

Authentication server 140 may be responsible for maintaining/storing one or more policies for network devices, such as network device 110. In various embodiments, authentication server 140 may be any combination of an Authentication Server Function (AUSF), an Authentication, Authorization, and Accounting (AAA) function/server, a Policy Control Function (PCF), a Policy and Charging Rules Function (PCRF), a Home Subscriber Server (HSS), a Unified Data Repository (UDR), a Unified Data Management (UDM) service, and/or the like. In some instances, authentication server 140 may be implemented as a Cisco® Identity Services Engine (ISE), and may support any combination of Remote Authentication Dial-In User Service (RADIUS) and/or Diameter protocols.

Controller 150 may be configured to perform overall management of system 100. For instance, controller 150 may handle deployment, connectivity, and lifecycle of the network infrastructure, and obtain/monitor telemetry data regarding application performance and user connectivity. A network administrator may interface with controller 150 and customize how it manages system 100. In one example, controller 150 may be implemented as a Cisco Digital Network Architecture Center (DNA-C).

UPF 160 may be configured to handling routing of network packets between RAN node 120 and DN 170. DN 170 may include one or more of the Internet, an Internet Protocol (IP) Multimedia Subsystem (IMS), Ethernet network, Ethernet switching system(s), and/or the like. DN 170 may facilitate user plane (e.g., user data/data transfer) connectivity for per-access sessions. For example, network device 110 may access various services, applications, etc. from DN 170.

Conventionally, to provision a network device that is attempting to join a network, a network administrator would manually provision attributes in the network device which, when presented by the network device to the core network, would enable the core network to map the network device to the appropriate services/policies. With the continuing growth in both number and variety of network devices, it is no longer feasible to provision network devices in this manner. For instance, a single network may have thousands of connected network devices, many of which may present difficulties in provisioning using conventional techniques. Examples of such network devices may include headless devices, low power devices, remote presence devices, etc. Headless devices, for instance, do not have Subscriber Identification Module (SIM) cards to denote the applicable network policy. In addition, the way these network devices can interact with the core network can vary greatly: some network devices might connect over 5G connections and others might connect over non-5G connections such as via a Non-3GPP Inter-Working Function (N3IWF); furthermore, some network devices may or may not be configured with OTA provisioning capabilities.

Accordingly, to improve the provisioning process during onboarding of network device 110, PCGW 130 is provided with provisioning logic 180. Briefly, provisioning logic 180 may enable PCGW 130 to automatically provision network device 110 based on a device type of network device 110. In one specific example, the device type may be an IoT device type (e.g., indicating that network device 110 is an IoT device). In a further example, the device type may be an IoT device sub-type (e.g., indicating that network device 110 is a specific type of IoT device, such as a device integrated with a smart lighting or trash management system, for example.).

PCGW 130 may identify the device type of network device 110 based on an indication of the device type (e.g., a device type tag) obtained from authentication server 140, RAN node 120, or network device 110, or autonomously based on telemetry data. In various embodiments, controller 150 may assist in determining the device type of network device 110, e.g., using Artificial Intelligence (AI)/Machine Learning (ML) techniques. In one example, PCGW 130 may determine the device type during a registration procedure of network device 110.

PCGW 130 may obtain an indication to provision network device 110 and, based on the device type of network device 110, provisions network device 110 with one or more network resources. In one example, the indication to provision network device 110 may be a PDU session establishment request obtained from network device 110, and PCGW 130 may provision network device 110 during a PDU session establishment procedure for network device 110.

To provision network device 110 with the one or more network resources, PCGW 130 may maintain a mapping between the device type tag and the applicable network resource(s). In one example, based on the device type, PCGW 130 may select one or more of a network slice (e.g., Network Slice Selection Assistance Information (NSSAI)) for network device 110, a Data Network Name (DNN) for network device 110, or a Quality of Service (QoS) policy for network device 110. In one specific example, PCGW 130 may provide an indication of the device type to a Network Slice Selection Function (NSSF) configured to select the NSSAI.

Thus, PCGW 130 may derive a network slice, DNN, and/or QoS policy for a given class/kind/type of devices (e.g., IoT devices) that have similar characteristics and therefore use similar policies. For instance, based on the device type, PCGW 130 may select a network slice, DNN, and/or QoS policy for enhanced Mobile BroadBand (eMBB), massive Machine Type Communications (mMTC), and/or Ultra Reliable Low Latency Communications (URLLC). In one specific example, if the device type is an IoT device type, PCGW 130 may select an mMTC network slice, IoT DNN, and IoT QoS policy. Or, if the device type is a mobile device type, PCGW 130 may select a URLLC network slice, an Internet DNN, and a mobile QoS policy. Other embodiments may be envisioned.

Upon selecting the network slice/DNN/QoS policy, PCGW 130 may provide an indication to allocate the one or more network resources to network device 110. PCGW 130 may provide the indication to a network function, such as UPF 160, configured to manage respective network resources allocated to respective device types. It will be appreciated that PCGW 130 may provide the indication to any suitable network function, such as a Control Plane Function (CPF).

PCGW 130 may select the network slice/DNN/QoS policy based on the automated, dynamic classification of network device 110 into a device type category. Any suitable classification technique may be used for the purpose of automatic resource assignments. In one example, PCGW 130 may determine the device type based on an indication of the device type obtained from authentication server 140, as discussed below in connection with FIG. 2. In another example, PCGW 130 may determine the device type based on an indication of the device type obtained from RAN node 120, as discussed below in connection with FIG. 3. In still another example, PCGW 130 may determine the device type based on an indication of the device type obtained from network device 110, as discussed below in connection with FIG. 4. In yet another example, PCGW 130 may determine the device type autonomously based on telemetry data, as discussed below in connection with FIG. 5.

In one example, one or more of the techniques described in connection with FIGS. 2-5 may be performed sequentially. For example, PCGW 130 may attempt to determine the device type based on an indication of the device type obtained from authentication server 140 (FIG. 2), and if that attempt fails, PCGW 130 may attempt to determine the device type based on an indication of the device type obtained from RAN node 120 (FIG. 3), and if that attempt fails, PCGW 130 may attempt to determine the device type based on an indication of the device type obtained from network device 110 (FIG. 4), and if that attempt fails, PCGW 130 may attempt to autonomously determine the device type based on telemetry data (FIG. 5). PCGW 130 may attempt to determine the device type using these techniques in any suitable sequence/order. It will be appreciated that PCGW 130 may also/alternatively attempt to determine the device type using one or more of these techniques in parallel (and/or sequentially). PCGW 130 may attempt to determine the device type using a subset or all of these techniques. Other embodiments may be envisioned.

Figure 2:
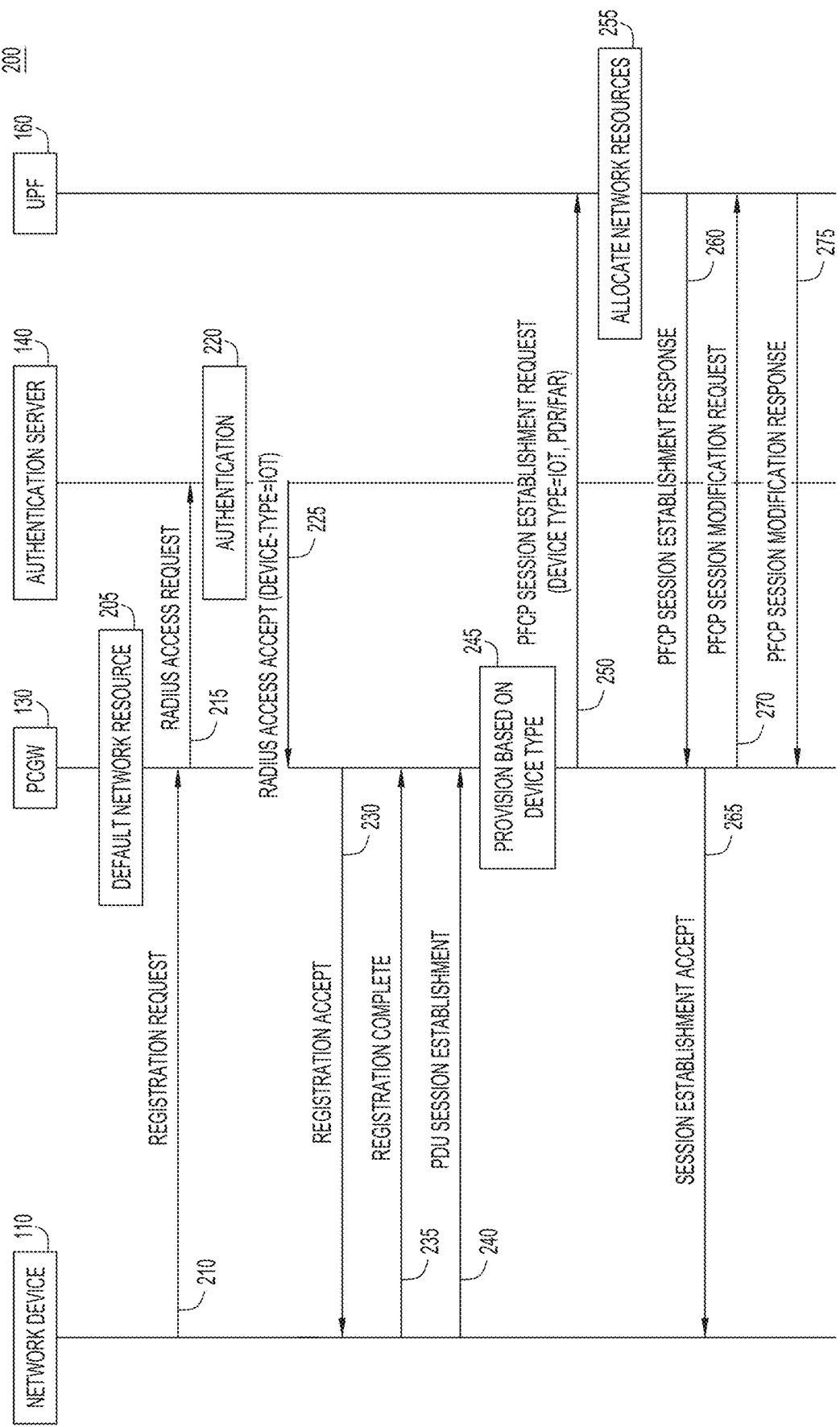
FIG. 2 illustrates a flow diagram of a method for network device provisioning based on an indication of device type obtained from an authentication server, according to an example embodiment.

With reference to FIG. 2, FIG. 2 illustrates a flow diagram of a method 200 for network device provisioning based on an indication of device type obtained from authentication server 140, according to an example embodiment. Initially, at operation 205, PCGW 130 is configured with a default network resource (e.g., slice/DNN/QoS policy) configuration mapping to the device type. At operation 210, PCGW 130 obtains, from network device 110, a registration request. At operation 215, PCGW 130 may provide, to authentication server 140, a request to authenticate network device 110 (e.g., a RADIUS access request).

At operation 220, authentication server 140 authenticates network device 110 and determines a device type of network device 110. Authentication server 140 may determine the device type using any suitable technique, such as identity-based classification and/or ML-based classification. Using identity-based classification, authentication server 140 may determine the device type based on an identifier of network device 110 (e.g., Media Access Control (MAC) address, International Mobile Subscriber Identity (IMSI), etc.). Thus, using a variety of techniques, the authentication server classifies the network device to determine a device type of the network device.

Using ML-based classification, authentication server 140 may determine the device type using a ML classification engine that has been trained, based on historical data, to derive the device type based on one or more dynamically obtained attributes/characteristics of network device 110. The dynamically obtained attributes/characteristics may include information obtained (directly or indirectly) from network device 110, such as Dynamic Host Configuration Protocol (DHCP) information, Hypertext Transfer Protocol (HTTP) header information (e.g., user agent header), provisioned information embedded by network device 110 in one or more Non-Access Stratum (NAS) Information Elements (IEs), etc.

In one example, the ML classification engine may be local to authentication server 140, and authentication server 140 may determine the device type autonomously. In another example, the ML classification engine may be located at controller 150 (FIG. 1), and controller 150 may offer the ML classification engine as a service (referred to herein as "device classification assist") to help authentication server 140 determine the device type. For example, authentication sever 140 may provide the dynamically obtained attributes/characteristics of network device 110 to controller 150; controller 150 may, in turn, use the ML classification engine to determine the device type and provide the device type (e.g., in the form of a device type tag/device type classification tag, which may be vendor-specific) to authentication server 140. In this example, the device type of network device 110 is an IoT device type.

At operation 225, in response to the request to authenticate network device 110, PCGW 130 obtains, from authentication server 140, an indication of the device type of network device 110. The indication of the device type may be the device type tag, and may be embedded in an indication that network device 110 is authenticated. For instance, the device type tag may be embedded as an AAA/authentication attribute/parameter in a RADIUS access accept message that includes one or more network policies that are applicable to network device 110.

At operation 230, PCGW 130 provides, to network device 110, an indication that the registration request (operation 210) is accepted. At operation 235, PCGW 130 obtains, from network device 110, an indication that registration is complete. At operation 240, PCGW 130 obtains, from network device 110, a PDU session establishment request to create a best-effort flow. The PDU session establishment request may lack an explicit indication of which network resources (e.g., DNN, NSSAI, etc.) with which to provision network device 110.

At operation 245, PCGW 130 determines that network device 110 has not provided an indication of which network resources (e.g., DNN, NSSAI, etc.) to provision network device 110 with, and in response, PCGW 130 provisions network device 110 with one or more network resources based on the device type of network device 110. In particular, because the device type tag obtained from authentication server 140 (operation 225) indicates that network device 110 is an IoT device type, PCGW 130 assigns an mMTC network slice, an IoT DNN, and an IoT QoS policy. In one example, the IoT device type may be mapped to the default network resource configuration as discussed above in relation to operation 205.

At operation 250, PCGW 130 provides, to UPF 160, an indication to allocate the one or more network resources to network device 110. The indication to allocate the one or more network resources may be embedded in a Packet Forwarding Control Protocol (PFCP) session establishment request sent over the N4 interface. The PFCP session establishment request may include one or more session parameters such as uplink and downlink Packet Detection Rules (PDRs) and Forwarding Action Rules (FARs). The PFCP session establishment request may also be enhanced with an IE that includes an indication of the device type of network device 110.

At operation 255, in response to the PFCP session establishment request, UPF 160 may allocate one or more network resources to network device 110. In one example, UPF 160 may be configured to manage respective network resources (e.g., Central Processing Units (CPUs), memory pools, queues, etc.) allocated to respective device types (e.g., IoT devices). Thus, based on the device type of network device 110, UPF 160 may select the applicable QoS policy, allocate one or more network resources to network device 110 from among the network resources allocated to IoT devices, and apply the QoS policy at the data plane. In one example, UPF 160 may maintain a mapping of QoS policy to device type.

At operation 260, PCGW 130 obtains, from UPF 160, a PFCP session establishment response. At this point, a PDU session has been created with a QoS flow on the data plane based on the device type. At operation 265, PCGW 130 provides, to network device 110, a session establishment accept message. At some later time, at operation 270, PCGW 130 may provide, to UPF 160, a PFCP session modification request, e.g., to update the FAR(s) with a gNB Tunnel Endpoint Identifier (TEID). At operation 275, PCGW 130 may obtain, from UPF 160, a PFCP session modification response, e.g., confirming that the update was successful.

Figure 3:
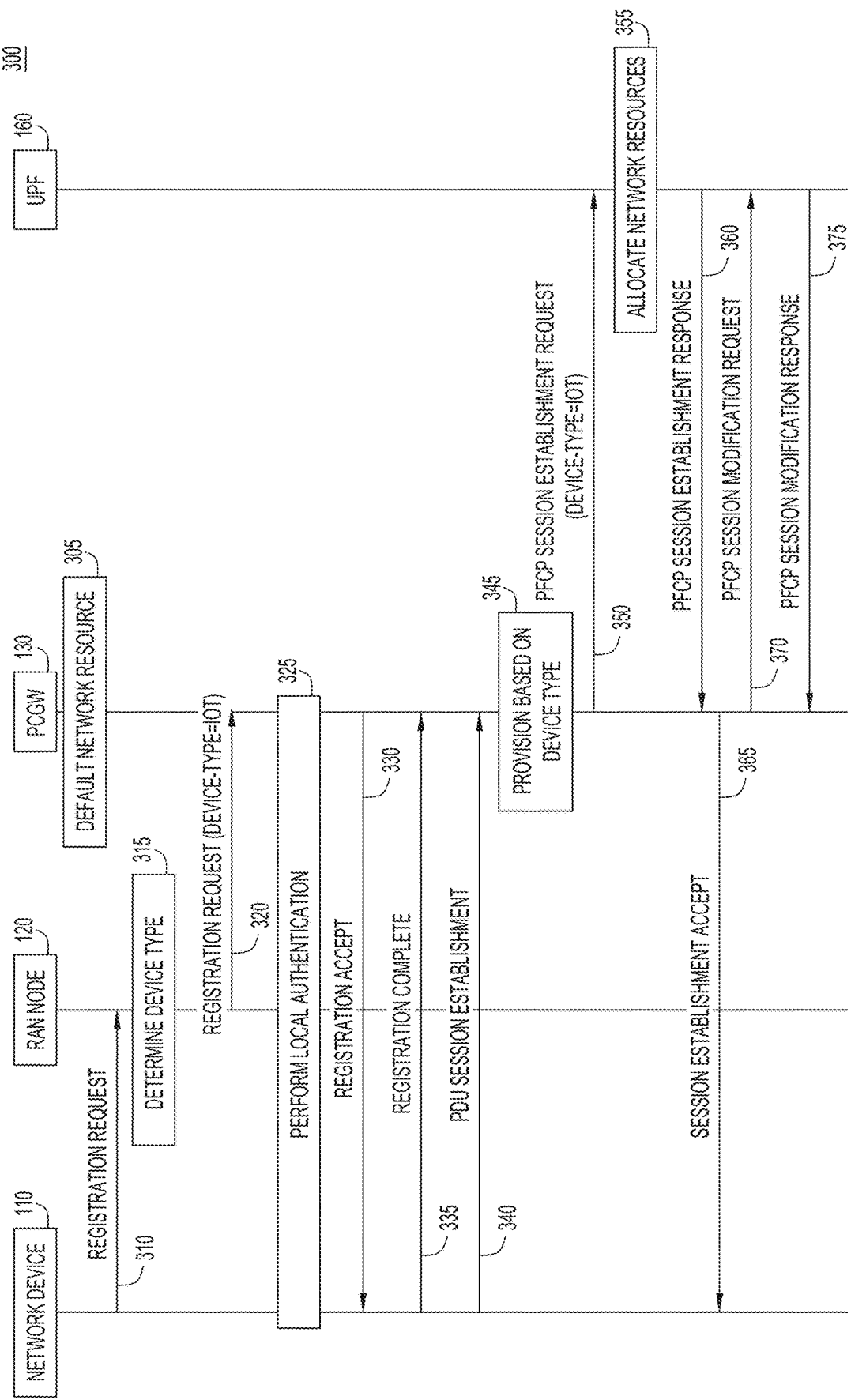
FIG. 3 illustrates a flow diagram of a method for network device provisioning based on an indication of device type obtained from a radio access network, according to an example embodiment.

FIG. 3 illustrates a flow diagram of a method 300 for network device provisioning based on an indication of device type obtained from RAN node 120, according to an example embodiment. Initially, at operation 305, PCGW 130 is configured with a default network resource configuration based on device type. At operation 310, RAN node 120 obtains, from network device 110, a registration request.

At operation 315, RAN node 120 determines a device type of network device 110. RAN node 120 may determine the device type using any suitable technique, such as ML-based Radio Frequency (RF) fingerprinting. With ML-based RF fingerprinting, RAN node 120 may determine the device type using a ML classification engine that has been trained, based on historical data, to derive the device type based on one or more dynamically obtained RF characteristics of network device 110.

In one example, the ML classification engine may be local to RAN node 120, and RAN node 120 may determine the device type autonomously, e.g., based on traffic pattern gleaning. In another example, the ML classification engine may be located at controller 150 (FIG. 1), and controller 150 may offer the ML classification engine as a service (referred to herein as an "RF fingerprinting assist") to help RAN node 120 determine the device type. For example, RAN node 120 may provide the dynamically obtained attributes/characteristics of network device 110 to controller 150; controller 150 may, in turn, use the ML classification engine to determine the device type and provide the device type (e.g., in the form of a device type tag/device type classification tag, which may be vendor-specific) to RAN node 120.

At operation 320, PCGW 130 obtains, from RAN node 120, an indication of the device type of network device 110. The indication of the device type may be the device type tag. The indication of the device type may be included in the registration request, which may be enhanced with an inline/piggybacked N2 parameter/IE that contains the device type tag. In this example, the device type of network device 110 is an IoT device type. At operation 325, because authentication server 140 is absent in this example, PCGW 130 may perform local authentication of network device 110.

Operations 330-375 may generally track operations 230-275 (FIG. 2). Briefly, at operation 330, PCGW 130 provides, to network device 110, an indication that the registration request (operation 310) is accepted. At operation 335, PCGW 130 obtains, from network device 110 (via RAN node 120) an indication that registration is complete. At operation 340, PCGW 130 obtains, from network device 110 (via RAN node 120), a PDU session establishment request to create a best-effort flow. At operation 345, PCGW 130 provisions network device 110 with one or more network resources based on the device type of network device 110. At operation 350, PCGW 130 provides, to UPF 160, an indication to allocate the one or more network resources to network device 110. At operation 355, in response to the PFCP session establishment request, UPF 160 may allocate one or more network resources to network device 110. At operation 360, PCGW 130 obtains, from UPF 160, a PFCP session establishment response. At operation 365, PCGW 130 provides, to network device 110, a session establishment accept message. At operation 370, PCGW 130 may provide, to UPF 160, a PFCP session modification request. At operation 375, PCGW 130 may obtain, from UPF 160, a PFCP session modification response.

Figure 4:
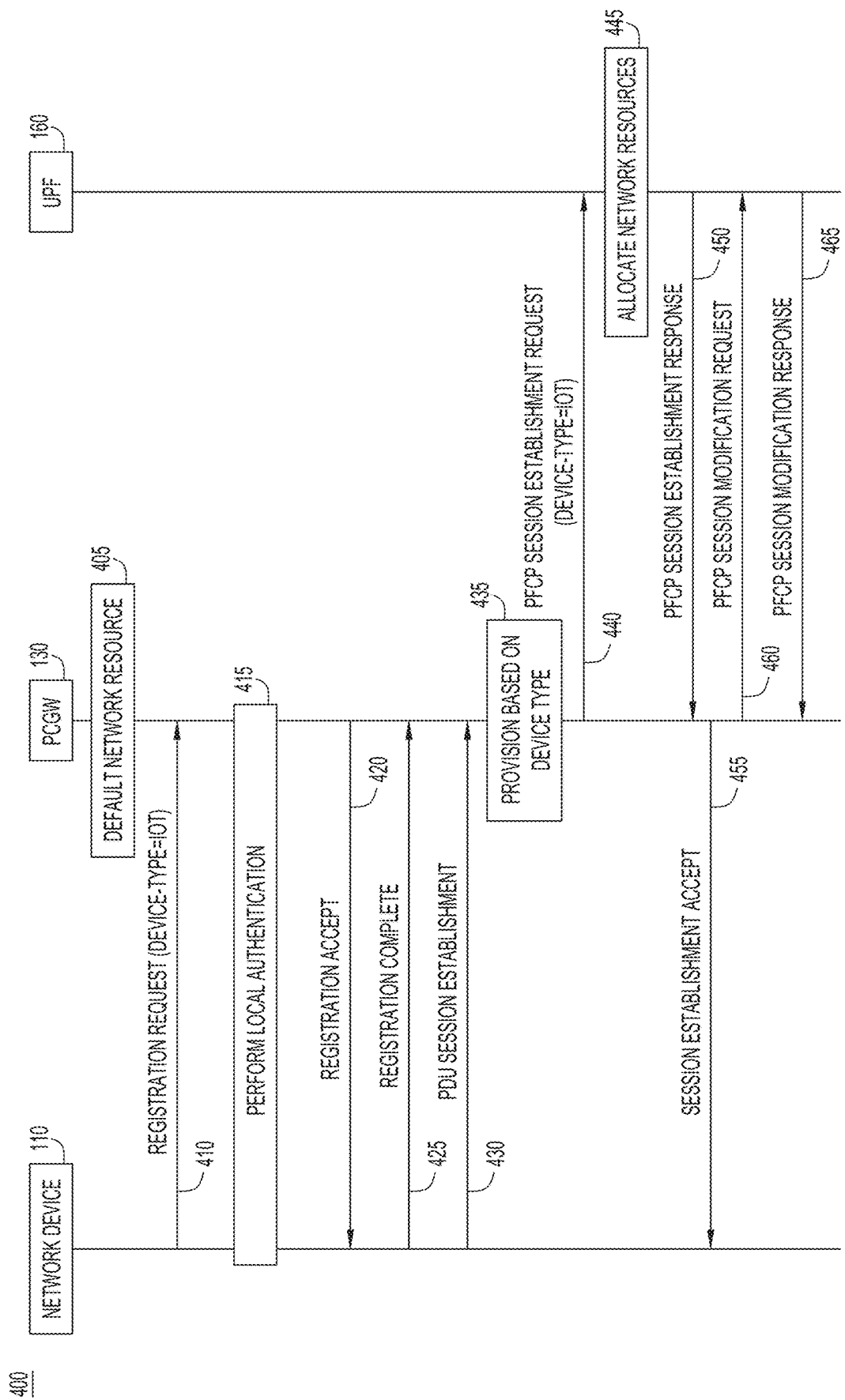
FIG. 4 illustrates a flow diagram of a method for network device provisioning based on an indication of device type obtained from a network device, according to an example embodiment.
Figure 5:
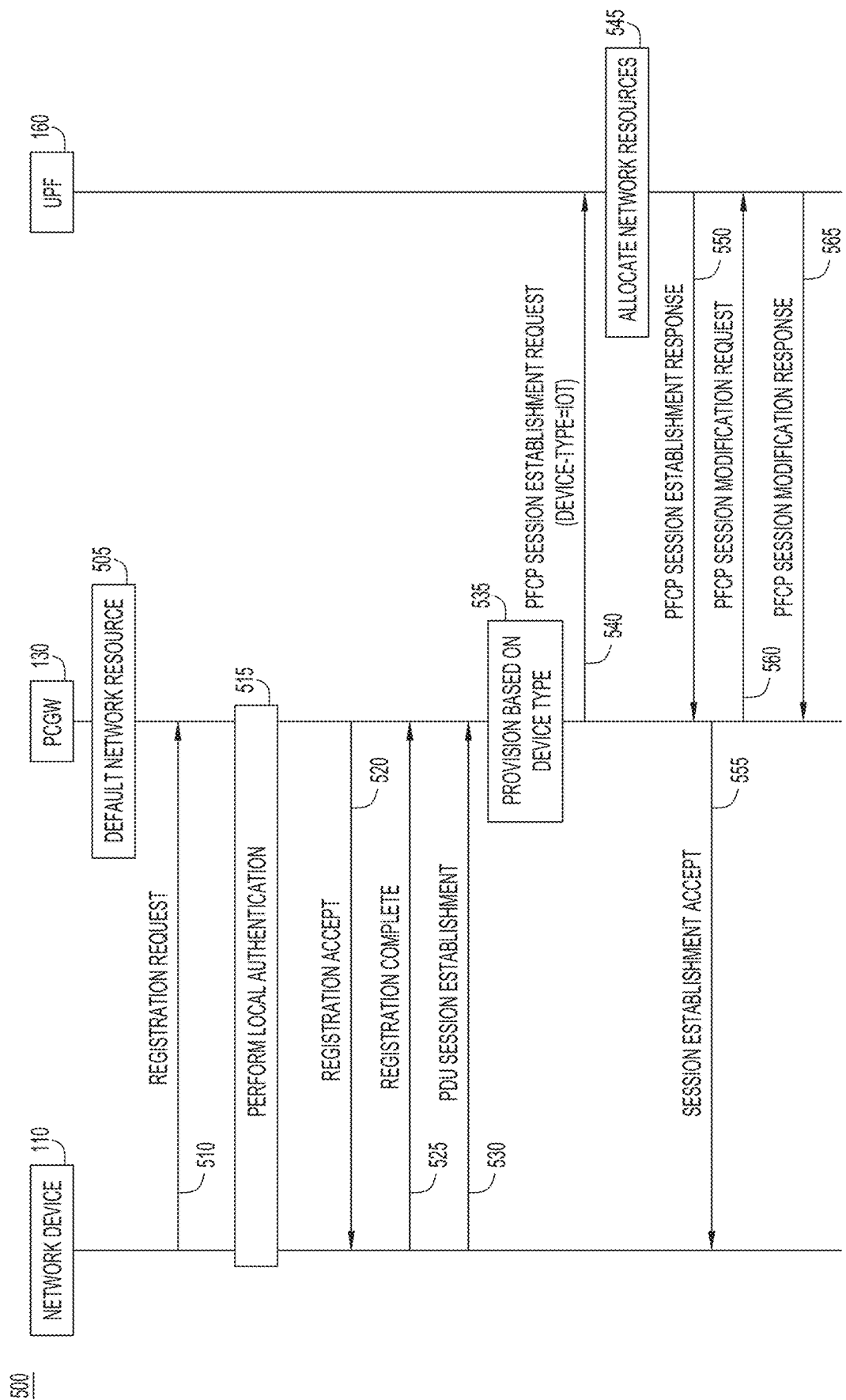
FIG. 5 illustrates a flow diagram of a method for network device provisioning based on an autonomously determined device type, according to an example embodiment.

FIG. 4 illustrates a flow diagram of a method 400 for network device provisioning based on an indication of device type obtained from network device 110, according to an example embodiment. Initially, at operation 405, PCGW 130 is configured with a default network resource configuration based on device type. At operation 410, PCGW 130 obtains, from network device 110, a registration request that includes an indication of the device type of network device 110. The indication of the device type may be the device type tag. The device type tag may be a factory setting assigned at manufacturing (e.g., Manufacturer Usage Description (MUD)), and may be provided to PCGW 130 in an HTTP user agent header. In this example, the device type of network device 110 is an IoT device type. At operation 415, because authentication server 140 is absent in this example, PCGW 130 may perform local authentication of network device 110.

Operations 420-465 may generally track operations 230-275 (FIG. 2). Briefly, at operation 420, PCGW 130 provides, to network device 110, an indication that the registration request (operation 410) is accepted. At operation 425, PCGW 130 obtains, from network device 110, an indication that registration is complete. At operation 430, PCGW 130 obtains, from network device 110, a PDU session establishment request to create a best-effort flow. At operation 435, PCGW 130 provisions network device 110 with one or more network resources based on the device type of network device 110. At operation 440, PCGW 130 provides, to UPF 160, an indication to allocate the one or more network resources to network device 110. At operation 445, in response to the PFCP session establishment request, UPF 160 may allocate one or more network resources to network device 110. At operation 450, PCGW 130 obtains, from UPF 160, a PFCP session establishment response. At operation 455, PCGW 130 provides, to network device 110, a session establishment accept message. At operation 460, PCGW 130 may provide, to UPF 160, a PFCP session modification request. At operation 465, PCGW 130 may obtain, from UPF 160, a PFCP session modification response.

FIG. 5 illustrates a flow diagram of a method 500 for network device provisioning based on an autonomously determined device type, according to an example embodiment. Initially, at operation 505, PCGW 130 is configured with a default network resource configuration based on device type. At operation 510, PCGW 130 obtains, from network device 110, a registration request. At operation 515, because authentication server 140 is absent in this example, PCGW 130 may perform local authentication of network device 110.

Before, during, or after local authentication, PCGW 130 (and/or an external application in communication with PCGW 130) may determine the device type of network device 110. In one example, PCGW 130 (and/or the external application) may obtain telemetry data associated with network device 110 and, based on the telemetry data, determine the device type. The telemetry data may be collected by a Network Data Analytics Function (NWDAF).

PCGW 130 (and/or the external application) may determine the device type using any suitable technique, such as identity-based classification and/or ML-based classification. Using identity-based classification, PCGW 130 may determine the device type based on an identifier of network device 110 (e.g., MAC address, IMSI, etc.). Using ML-based classification, PCGW 130 may determine the device type using a ML classification engine that has been trained, based on historical data, to derive the device type based on one or more dynamically obtained attributes/characteristics of network device 110. The dynamically obtained attributes/characteristics may include information obtained from network device 110, such as DHCP information, HTTP header information (e.g., user agent header), provisioned information embedded by network device 110 in one or more NAS IEs, etc.

In one example, the ML classification engine may be local to PCGW 130 (and/or the external application), and PCGW 130 (and/or the external application) may determine the device type autonomously. In another example, the ML classification engine may be located at controller 150 (FIG. 1), and controller 150 may offer a device classification assist to help PCGW 130 determine the device type. For example, PCGW 130 may provide the dynamically obtained attributes/characteristics of network device 110 to controller 150; controller 150 may, in turn, use the ML classification engine to determine the device type and provide the device type (e.g., in the form of a device type tag/device type classification tag, which may be vendor-specific) to PCGW 130.

Operations 520-565 may generally track operations 230-275 (FIG. 2). Briefly, at operation 520, PCGW 130 provides, to network device 110, an indication that the registration request (operation 510) is accepted. At operation 525, PCGW 130 obtains, from network device 110, an indication that registration is complete. At operation 530, PCGW 130 obtains, from network device 110, a PDU session establishment request to create a best-effort flow. At operation 535, PCGW 130 provisions network device 110 with one or more network resources based on the device type of network device 110. At operation 540, PCGW 130 provides, to UPF 160, an indication to allocate the one or more network resources to network device 110. At operation 545, in response to the PFCP session establishment request, UPF 160 may allocate one or more network resources to network device 110. At operation 550, PCGW 130 obtains, from UPF 160, a PFCP session establishment response. At operation 555, PCGW 130 provides, to network device 110, a session establishment accept message. At operation 560, PCGW 130 may provide, to UPF 160, a PFCP session modification request. At operation 565, PCGW 130 may obtain, from UPF 160, a PFCP session modification response.

In some instances, PCGW 130 may be unable to identify the device type of network device 110 before operations 535 and 540 (e.g., before provisioning network device 110 with network resources). In this situation, PCGW 130 may register network device 110 with the default network resource configuration and place network device 110 in a policy scout list. Then, sometime after assigning the default network resources, PCGW 130 may glean data traffic associated with network device 110 determine the device type and initiate a policy change and reallocation of resources for network device 110 based on the device type.

Figure 6:
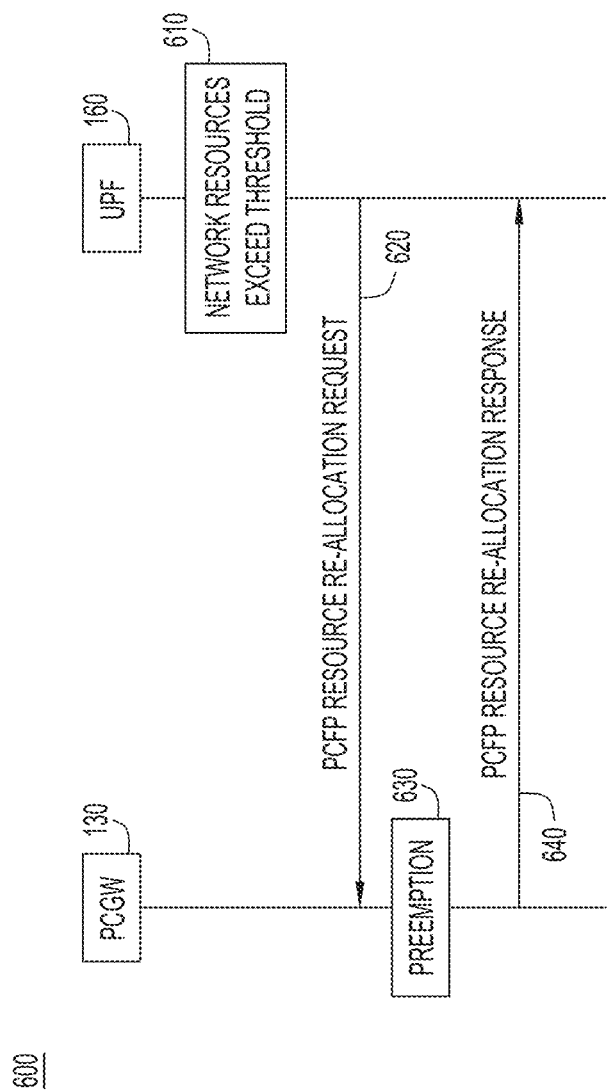
FIG. 6 illustrates a flow diagram of a method for re-allocating network resources based on device type, according to an example embodiment.

As discussed above, UPF 160 may be configured to manage respective network resources allocated to respective device types; thus, UPF 160 may segment/partition network resources based on device type. For example, UPF 160 may allocate, to network device 110, some network resources from the resource reservation pool associated with IoT devices. Occasionally, however, the demand for network resources within a given resource reservation pool may exceed the availability of the network resources within that resource reservation pool. This situation may be addressed in FIG. 6, which illustrates a flow diagram of a method 600 for re-allocating network resources based on device type, according to an example embodiment.

In one example, method 600 may occur after methods 200-500 (FIGS. 2-5) (e.g., after one or more network resources have been allocated to network device 110 based on its device type). In this example, the IoT device type may be assigned a higher priority than another device type. At operation 610, UPF 160 detects that one or more network resources (e.g., measured by bandwidth) allocated to the IoT device type has exceeded a threshold. At operation 620, PCGW 130 obtains, from UPF 160, a request to re-allocate the one or more network resources based on a priority of the IoT device type. The request may indicate the device type for which the bandwidth has been exceeded (here, IoT device type).

At operation 630, PCGW 130 may pre-empt the other, lower-priority device type with the higher-priority IoT device type by re-allocating network resources from the other device type to the IoT device type. At operation 640, PCGW 130 may, in response to obtaining the request to re-allocate the one or more network resources (operation 620), provide, to UPF 160, an indication to re-allocate the one or more network resources. The indication may be a PFCP node report response that includes the device types and updated resource reservation information. Thus, PCGW 130 may prioritize network resources based on the criticality of a device type.

FIG. 7 illustrates a table 700 of IEs configured for re-allocating network resources based on device type, according to an example embodiment. The IEs shown in table 700 (Node ID, Node Report Type, and User Plane Resource Reallocation) may be included in the resource re-allocation request and/or resource reallocation response illustrated in FIG. 6 at operation 620 and operation 640, respectively. In one example, the resource re-allocation request and resource reallocation response may be PFCP messages.

The User Plane Resource Reallocation IE may indicate the device type requiring more network resources, and the associated network resources (e.g., CPU, memory pool, queue allocation information, etc.). The presence ("P") of the User Plane Resource Reallocation IE is conditional ("C"), rather than mandatory ("M"). Specifically, the presence of the User Plane Resource Reallocation IE depends on whether the Node Report Type IE indicates a User Plane Resource Reallocation Report.

Figure 8:
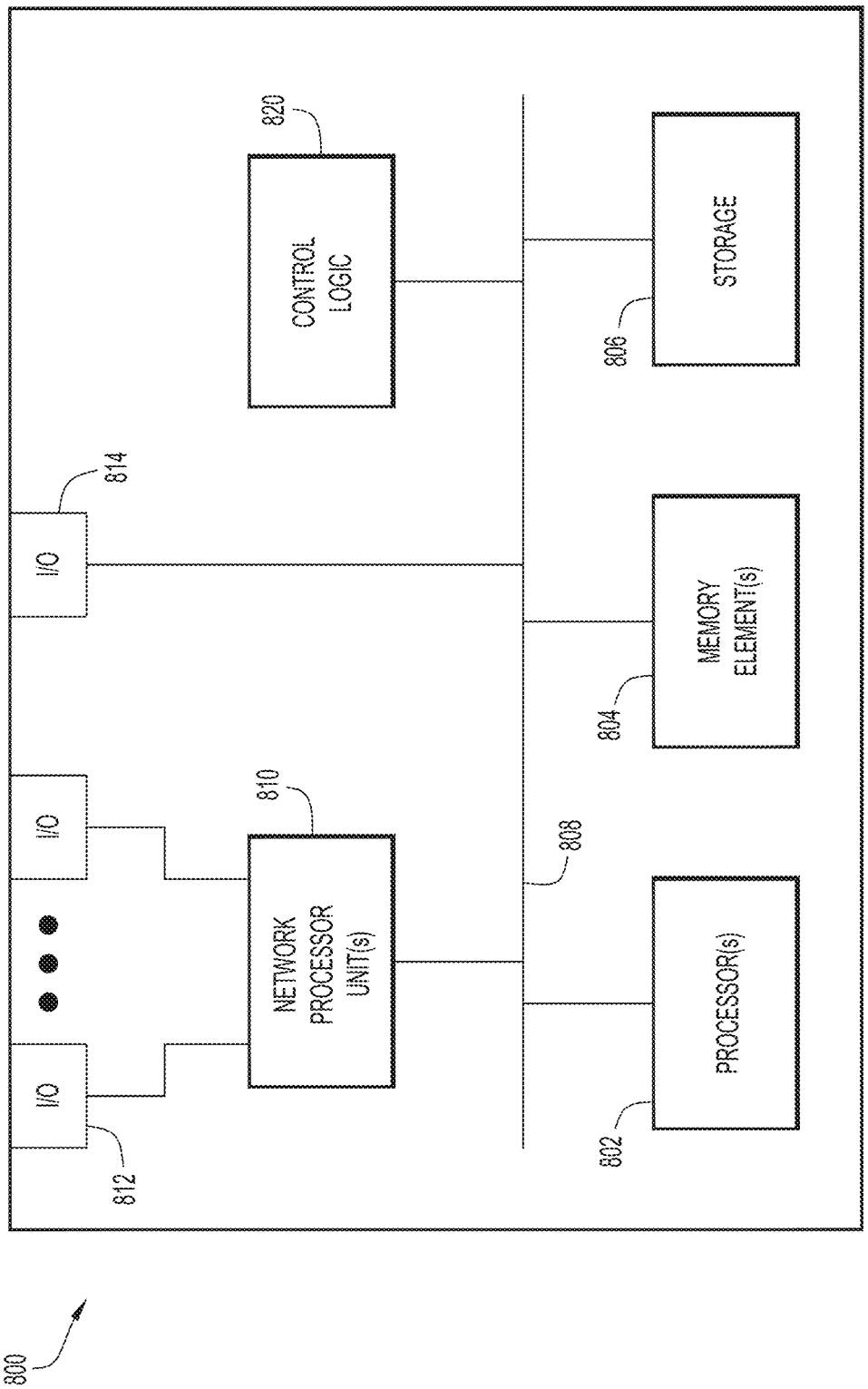
FIG. 8 illustrates a hardware block diagram of a computing device configured to perform functions associated with operations discussed herein, according to an example embodiment.

Referring to FIG. 8, FIG. 8 illustrates a hardware block diagram of a computing device 800 that may perform functions associated with operations discussed herein in connection with the techniques depicted in FIGS. 1-7. In various embodiments, a computing device, such as computing device 800 or any combination of computing devices 800, may be configured as any entity/entities as discussed for the techniques depicted in connection with FIGS. 1-7 in order to perform operations of the various techniques discussed herein.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interfaces 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device 800; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory elements 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 800 for transfer onto another computer readable storage medium.

Figure 9:
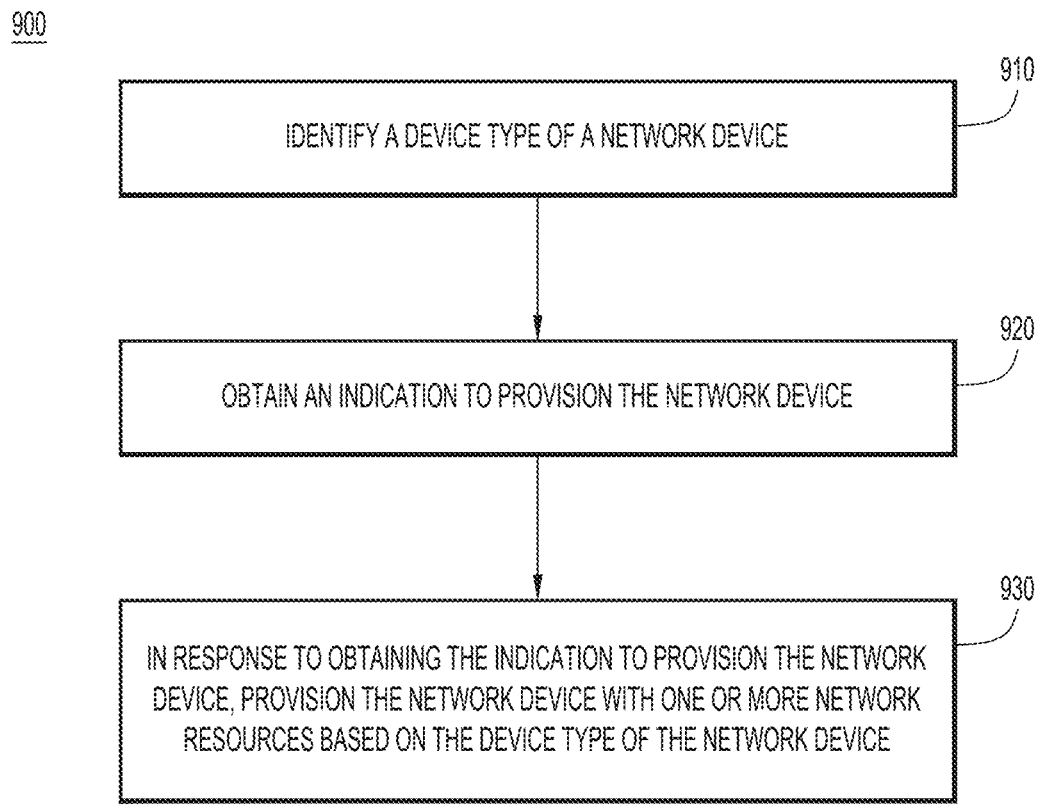
FIG. 9 illustrates a flowchart of a method for performing functions associated with operations discussed herein, according to an example embodiment.

FIG. 9 is a flowchart of an example method 900 for performing functions associated with operations discussed herein. Method 900 may be performed by a PCGW of a cellular core network, such as PCGW 130. At operation 910, the PCGW identifies a device type of a network device. At operation 920, the PCGW obtains an indication to provision the network device. At operation 930, in response to obtaining the indication to provision the network device, the PCGW provisions the network device with one or more network resources based on the device type of the network device.

Techniques disclosed herein may enable automatic resource and policy selection for UEs based on device classification and/or RF fingerprinting. These techniques may simplify and optimize resource allocation (e.g., slice-allocation, DNN selection, QoS policy application, etc.) by categorizing 5G UEs into different device types using "device type tags." This may enable provisioning of policies/attributes/protocols based on device classification (and/or device classification assists from a controller).

As disclosed herein, an authentication server and/or RAN node may be enhanced for RF fingerprinting, deducing a device type tag, and/or providing the 5G device type to a PCGW. The PCGW and UPF may be enhanced to store and utilize the received device type and select/apply the NSSAI, DNN, QoS policy, etc. based on device type and perform resource reservation based on the device type. The UPF may be enhanced to monitor QoS policy bandwidth threshold limits and priority per device-type and, if the threshold is exceeded, indicate the same to the PCGW. The PCGW may, in turn, pre-empt lower priority device-type QoS flows and re-allocate more bandwidth to higher priority device-type QoS flows.

The PCGW may select the default slice/DNN and QoS policy based on UE device type when there is no explicit DNN/slice information presented by the UE during PDU session establishment. The PCGW may maintain a configuration mapping based on device type and corresponding default slice/DNN/QoS policy information. The UE and PCGW may handle a device type tag/IE in a NAS registration message. The PCGW may store the UE to device type information in the UE context. The PCGW may receive the device-type information in a RADIUS access accept message when received from a AAA server or as an N2 parameter when received from a RAN node.

The PCGW may communicate the device type to the UPF over the N4 interface. The UPF may maintain system resources (e.g., CPU/memory pool, queues, and corresponding thresholds) based on device-type. The UPF may further detect bandwidth threshold exceeding for critical device types and communicate the same to the PCGW using a "Resource Reallocation Request" PFCP message indicating the device type for which threshold has been exceeded. In another embodiment, the PFCP node report request message may be enhanced with a "node report type" as the "user plane resource reallocation" request indicating the device-type for which more resources are to be reserved.

The PCGW may maintain the priority of device-types and the associated resource reservation pools, and may further re-allocate the resources and send the reallocation to the UPF in a "Resource Reallocation Response" or in the PFCP node report response containing the device-types to update the resource reservation information. The PCGW may pre-empt lower-priority device type sessions when bandwidth is exceeded for higher-priority device-types and thus re-allocate the bandwidth to higher-priority device-types.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: at a packet core gateway of a cellular core network: identifying a device type of a network device; obtaining an indication to provision the network device; and in response to obtaining the indication to provision the network device, provisioning the network device with one or more network resources based on the device type of the network device.

[0W] In one example, provisioning the network device with the one or more network resources includes: providing, to a network function configured to manage respective network resources allocated to respective device types, an indication to allocate the one or more network resources to the network device. In a further example, the method further comprises: obtaining, from the network function, a request to re-allocate the one or more network resources based on a priority of the device type of the network device; and in response to obtaining the request to re-allocate the one or more network resources, providing, to the network function, an indication to re-allocate the one or more network resources. In a still further example, the priority of the device type of the network device is higher than a priority of another device type, and providing the indication to re-allocate the one or more network resources includes: providing an indication to pre-empt the other device type with the device type of the network device.

In one example, identifying the device type of the network device includes: providing, to an authentication server, a request to authenticate the network device, wherein the authentication server is configured to classify the network device to determine the device type of the network device; and in response to the request to authenticate the network device, obtaining, from the authentication server, an indication of the device type of the network device.

In one example, obtaining the indication to provision the network device includes obtaining the indication to provision the network device from the network device via a radio access network configured to perform radio frequency fingerprinting to determine the device type of the network device; and identifying the device type of the network device includes obtaining, from the radio access network, an indication of the device type of the network device.

In one example, identifying the device type of the network device includes: obtaining, from the network device, an indication of the device type of the network device.

In one example, identifying the device type of the network device includes: obtaining telemetry data associated with the network device; and based on the telemetry data, determining the device type of the network device.

In one example, provisioning the network device with the one or more network resources includes: selecting one or more of a network slice for the network device, a data network name for the network device, or a quality of service policy for the network device.

In one example, provisioning the network device with the one or more network resources includes: reserving the one or more network resources for the network device.

In another form, an apparatus is provided. The apparatus comprises: a network interface configured to obtain or provide network communications; and one or more processors of a packet core gateway of a cellular core network, the one or more processors coupled to the network interface and configured to: identify a device type of a network device; obtain an indication to provision the network device; and in response to obtaining the indication to provision the network device, provision the network device with one or more network resources based on the device type of the network device.

In another form, one or more non-transitory computer readable storage media are provided. The non-transitory computer readable storage media are encoded with instructions that, when executed by a processor of a packet core gateway of a cellular core network, cause the processor to: identify a device type of a network device; obtain an indication to provision the network device; and in response to obtaining the indication to provision the network device, provision the network device with one or more network resources based on the device type of the network device.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    at a packet core gateway of a cellular core network, wherein the packet core gateway is at least one of an Access and Mobility Management Function (AMF) or a Session Management Function (SMF) of the cellular core network:
        identifying a device type of a network device, wherein the identifying includes obtaining an indication of the device type of the network device from a radio access node configured to perform radio frequency fingerprinting to determine the device type of the network device;
        obtaining an indication to provision the network device, wherein the indication is a session establishment request obtained from the network device following completion of a registration of the network device with the cellular core network; and
        in response to obtaining the indication to provision the network device, provisioning the network device with one or more network resources based on the device type of the network device.

2. The method of claim 1, wherein provisioning the network device with the one or more network resources includes:
    providing, to a network function configured to manage respective network resources allocated to respective device types, an indication to allocate the one or more network resources to the network device.

3. The method of claim 2, further comprising:
    obtaining, from the network function, a request to re-allocate the one or more network resources based on a priority of the device type of the network device; and
    in response to obtaining the request to re-allocate the one or more network resources, providing, to the network function, an indication to re-allocate the one or more network resources.

4. The method of claim 3, wherein the priority of the device type of the network device is higher than a priority of another device type, and wherein providing the indication to re-allocate the one or more network resources includes:
    providing an indication to pre-empt the another device type with the device type of the network device.

5. The method of claim 1, further comprising:
    providing, to an authentication server, a request to authenticate the network device, wherein the authentication server is configured to classify the network device to determine the device type of the network device; and
    in response to the request to authenticate the network device, obtaining, from the authentication server, another indication of the device type of the network device.

6. The method of claim 1, further comprising:
obtaining, from the network device, another indication of the device type of the network device.

7. The method of claim 1, further comprising:
obtaining telemetry data associated with the network device; and
based on the telemetry data, determining the device type of the network device.

8. The method of claim 1, wherein provisioning the network device with the one or more network resources includes:
selecting one or more of a network slice for the network device, a data network name for the network device, or a quality of service policy for the network device.

9. The method of claim 1, wherein provisioning the network device with the one or more network resources includes:
reserving the one or more network resources for the network device.

10. A packet core gateway of a cellular core network, comprising:
a network interface configured to obtain or provide network communications; and
one or more processors, the one or more processors coupled to the network interface and configured to:
identify a device type of a network device, wherein the identifying includes obtaining an indication of the device type of the network device from a radio access node configured to perform radio frequency fingerprinting to determine the device type of the network device;
obtain an indication to provision the network device, wherein the indication is a session establishment request obtained from the network device following completion of a registration of the network device with the cellular core network and the packet core gateway is at least one of an Access and Mobility Management Function (AMF) or a Session Management Function (SMF) of the cellular core network; and
in response to obtaining the indication to provision the network device, provision the network device with one or more network resources based on the device type of the network device.

11. The packet core gateway of claim 10, wherein the one or more processors are configured to:
provide, to an authentication server, a request to authenticate the network device, wherein the authentication server is configured to classify the network device to determine the device type of the network device; and
in response to the request to authenticate the network device, obtain, from the authentication server, another indication of the device type of the network device.

12. The packet core gateway of claim 10, wherein the one or more processors are configured to:
obtain, from the network device, another indication of the device type of the network device.

13. The packet core gateway of claim 10, wherein the one or more processors are configured to:
obtain telemetry data associated with the network device; and
based on the telemetry data, determine the device type of the network device.

14. One or more non-transitory computer readable storage media encoded with instructions that, when executed by a processor of a packet core gateway of a cellular core network, cause the processor to:
identify a device type of a network device, wherein the identifying includes obtaining an indication of the device type of the network device from a radio access node configured to perform radio frequency fingerprinting to determine the device type of the network device;
obtain an indication to provision the network device, wherein the indication is a session establishment request obtained from the network device following completion of a registration of the network device with the cellular core network and the packet core gateway is at least one of an Access and Mobility Management Function (AMF) or a Session Management Function (SMF) of the cellular core network; and
in response to obtaining the indication to provision the network device, provision the network device with one or more network resources based on the device type of the network device.

15. The one or more non-transitory computer readable storage media of claim 14, wherein the instructions further cause the processor to:
provide, to an authentication server, a request to authenticate the network device, wherein the authentication server is configured to classify the network device to determine the device type of the network device; and
in response to the request to authenticate the network device, obtain, from the authentication server, another indication of the device type of the network device.

16. The one or more non-transitory computer readable storage media of claim 14, wherein the instructions further cause the processor to:
obtain, from the network device, another indication of the device type of the network device.

17. The one or more non-transitory computer readable storage media of claim 14, wherein the instructions further cause the processor to:
obtain telemetry data associated with the network device; and
based on the telemetry data, determine the device type of the network device.

18. The one or more non-transitory computer readable storage media of claim 14, wherein provisioning the network device with the one or more network resources includes:
providing, to a network function configured to manage respective network resources allocated to respective device types, an indication to allocate the one or more network resources to the network device.

19. The one or more non-transitory computer readable storage media of claim 14, wherein provisioning the network device with the one or more network resources includes:
selecting one or more of a network slice for the network device, a data network name for the network device, or a quality of service policy for the network device.

20. The one or more non-transitory computer readable storage media of claim 14, wherein provisioning the network device with the one or more network resources includes:
reserving the one or more network resources for the network device.

* * * * *